S. B. COOKE.
TICKET HOLDER.
APPLICATION FILED SEPT. 5, 1917.
1,276,493.
Patented Aug. 20, 1918.
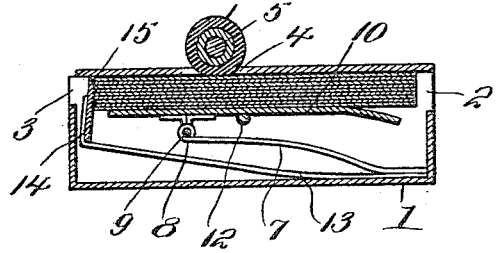
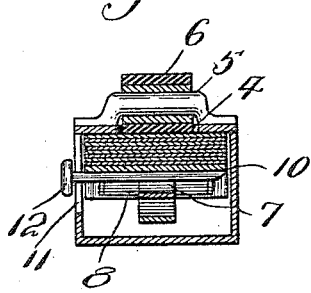
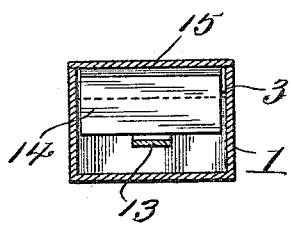
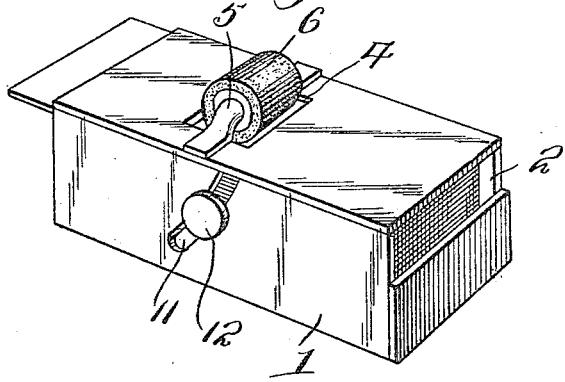
Witness
J. L. Wright
L. Wilcox
Inventor
S. B. Cooke
By Victor J. Evans
Attorney

UNITED STATES PATENT OFFICE.

SAMUEL B. COOKE, OF RICHMOND, VIRGINIA.

TICKET-HOLDER.

1,276,493. Specification of Letters Patent. Patented Aug. 20, 1918.

Application filed September 5, 1917. Serial No. 189,810.

*To all whom it may concern:*

Be it known that I, SAMUEL B. COOKE, a citizen of the United States, residing at Richmond, in the county of Henrico and State of Virginia, have invented new and useful Improvements in Ticket-Holders, of which the following is a specification.

This invention relates to ticket holders and it consists in the novel features hereinafter described and claimed.

An object of the invention is to provide a holder especially adapted to be used for retaining car tickets and the like in a manner that a single ticket may be withdrawn from the holder when desired while a number of tickets are retained in the same.

With this object in view the holder comprises a casing which is provided at one end with an inlet opening and at its opposite end with an outlet opening. A panel is resiliently supported within the holder and the bunch or pile of tickets is adapted to rest upon the said panel. A spring supported barrier is movably mounted adjacent the outlet opening of the casing and is chamfered at its upper inner edge, thus a single ticket is ejected from the casing at one time. A roller is journaled upon the casing and is adapted to have contact with the uppermost ticket of the pile or bunch whereby the said ticket is forced toward the outlet opening of the casing and beyond the said barrier.

In the accompanying drawing:—

Figure 1 is a longitudinal sectional view of the ticket holder.

Fig. 2 is a transverse sectional view of the same at the intermediate part thereof.

Fig. 3 is a similar view of the end part thereof.

Fig. 4 is a perspective view of the ticket holder.

The ticket holder comprises a casing 1 which is preferably made from metal and which is provided at one end with an inlet opening 2 and at its opposite end with an outlet opening 3. An opening 4 is provided at the top side of the said casing 1. A shaft 5 is disposed transversely across the opening 4 and a roller 6 is journaled upon the said shaft 5. The lower portion of the roller 6 is passed through the opening 4 and the said roller is provided with a peripheral cover of rubber or other suitable material. A spring 7 is mounted within the casing 1 and the said spring is provided at its end with a loop 8. The said loop 8 receives a shaft 9 which is attached to a panel 10 located within the casing 1. The casing 1 is provided at one side with a slot 11 and a pin 12 is attached to the panel 10 and extends through the said slot 11. A spring 13 is mounted within the casing 1 and carries at one end a barrier 14, the upper portion of which is normally disposed across the outlet opening 3 of the casing 1. The said barrier 14 is chamfered or beveled as at 15 at its upper inner edge.

In operation, the casing 1 is held in one hand and by pressing down upon the pin 12 the panel 10 is moved in a downward direction against the tension of the spring 7. A bunch of tickets is then inserted in the casing 1 through the inlet opening 2 until the said tickets are disposed between the upper surface of the panel and the roller 6. The pin 12 is then released and the pressure from the spring 7 forces the panel 10 in an upward direction whereby the uppermost ticket is held in contact with the periphery of the roller 6. When it is desired to withdraw a ticket from the holder, the thumb is moved over the roller 6 whereby the same is rotated and the uppermost ticket is moved across the bevel edge 15 of the barrier 14 and its end is projected through the outlet opening 3. The projecting portion of the said ticket may be readily grasped and consequently the said ticket may be readily withdrawn from the casing. This operation is repeated as often as there are tickets remaining in the casing and hence these tickets may be quickly withdrawn successively from the casing.

From the foregoing description taken in conjunction with the accompanying drawing, it will be seen that a ticket holder of simple and durable structure is provided, and that the parts may be readily manipulated to receive a bunch of tickets and to pass said tickets singly and successively from the casing of the holder.

Having described the invention what is claimed is:—

A ticket holder adapted to be used for delivering tickets singly and which may vary in transverse thickness, said holder comprising a casing having fixed walls, said casing being provided at one end and adjacent its top wall with an opening of sufficient size to permit the insertion of a stack of tickets, the casing having at its opposite end and adjacent its top wall an opening of sufficient size to permit of the exit of a single ticket irrespective of its relative transverse thickness, a spring located in the casing, a panel pivotally mounted on the spring and located within the casing between the said openings, and adapted to receive a stack of tickets, means for removing the tickets successively from the stack and for forcing the same through the exit opening, and a pin attached to the pivoted panel and extending through a side of the casing.

In testimony whereof I affix my signature.

SAMUEL B. COOKE.

Copies of this patent may be obtained for five cents each, by addressing the "Commissioner of Patents, Washington, D. C."